United States Patent
Wong

(10) Patent No.: US 9,402,178 B2
(45) Date of Patent: Jul. 26, 2016

(54) PAID INSTANT MESSAGE SYSTEM AND METHOD FOR AUTHENTICATING IDENTITIES USING A MOBILE TELEPHONE NETWORK

(71) Applicant: Kamfu Wong, Hong Kong (CN)

(72) Inventor: Kamfu Wong, Hong Kong (CN)

( * ) Notice: Subject to any disclaimer, the term of this patent is extended or adjusted under 35 U.S.C. 154(b) by 153 days.

(21) Appl. No.: 13/773,258

(22) Filed: Feb. 21, 2013

(65) Prior Publication Data
US 2014/0235199 A1  Aug. 21, 2014

(51) Int. Cl.
| H04M 11/00 | (2006.01) |
| H04W 12/06 | (2009.01) |
| H04L 12/58 | (2006.01) |
| H04M 15/00 | (2006.01) |
| H04M 17/00 | (2006.01) |

(52) U.S. Cl.
CPC .............. *H04W 12/06* (2013.01); *H04L 51/04* (2013.01); *H04M 15/39* (2013.01); *H04M 15/75* (2013.01); *H04M 15/751* (2013.01); *H04M 15/755* (2013.01); *H04M 17/103* (2013.01); *H04M 15/7553* (2013.01)

(58) Field of Classification Search
CPC ....................................................... H04W 4/26
USPC ................................ 455/406, 414.1, 418, 466
See application file for complete search history.

(56) References Cited

U.S. PATENT DOCUMENTS

| 5,999,967 | A  | * | 12/1999 | Sundsted ...................... 709/206 |
| 6,880,079 | B2 | * | 4/2005 | Kefford et al. ................ 713/155 |
| 7,085,745 | B2 | * | 8/2006 | Klug ............................. 705/401 |
| 2003/0023736 | A1 | * | 1/2003 | Abkemeier .................... 709/229 |
| 2003/0204726 | A1 | * | 10/2003 | Kefford et al. ................ 713/171 |
| 2005/0192899 | A1 | * | 9/2005 | Reardon ......................... 705/40 |
| 2005/0193075 | A1 | * | 9/2005 | Haff et al. ..................... 709/206 |
| 2005/0240432 | A1 | * | 10/2005 | Jensen .............................. 705/1 |
| 2005/0261964 | A1 | * | 11/2005 | Fang ............................... 705/14 |
| 2006/0041505 | A1 | * | 2/2006 | Enyart ............................ 705/40 |
| 2007/0239611 | A1 | * | 10/2007 | Blum ................ G06F 17/30749 705/51 |
| 2008/0201266 | A1 | * | 8/2008 | Chua et al. ...................... 705/67 |
| 2008/0244009 | A1 | * | 10/2008 | Rand et al. .................... 709/206 |
| 2009/0044013 | A1 | * | 2/2009 | Zhu et al. ...................... 713/170 |
| 2009/0156170 | A1 | * | 6/2009 | Rossano ............. H04L 12/5895 455/412.1 |
| 2010/0099421 | A1 | * | 4/2010 | Patel et al. .................... 455/450 |

* cited by examiner

*Primary Examiner* — Steve D Agosta
(74) *Attorney, Agent, or Firm* — Winstead PC

(57) ABSTRACT

A paid instant message system and method that authenticate identities using a mobile telephone network, which comprise: a message server, user cell phone, and mobile telephone networks. The user cell phone has an instant messaging application installed therein. Each user account includes a specified charge for sending and receiving messages. By means of a paying and charging mechanism, the present invention makes the cost for sending junk messages increase and make the people oversending messages to pay the corresponding price, thus preventing appearance of junk messages. As for the normal instant messaging among people, messages are sent and received by each other, so they pay each other, and in this case, the fees paid and charged by one person or by one company will almost be equal, hence this will not cause any burden and influence to anyone who normally uses the instant messaging.

7 Claims, 2 Drawing Sheets

PAID INSTANT MESSAGE SYSTEM AND METHOD FOR AUTHENTICATING IDENTITIES USING A MOBILE TELEPHONE NETWORK

TECHNICAL FIELD

The present invention relates to the technical field of mobile communications, in particular to a paid instant message system and method using a mobile telephone network to authenticate identities.

BACKGROUND OF THE INVENTION

With the popularization of mobile communications, cell phones have become a communication device that are carried around daily by people, and instant messaging has quickly become one of the commonly used ways of communication, too. The instant messaging has a fast transmission speed, and it can transmit messages immediately to the cell phone of a receiver and can learn whether the receiver has read the messages or not from the message transmission status, so instant messaging has replaced most of the functions of e-mails and facsimiles and become one of the indispensable communication means at present. Since instant messaging can transmit messages to the receiver instantly and accurately, it has been used by some people to forcibly send some commercial advertisements, personal advertisements or even adult messages or some unpleasant messages to users without the users' consent. When users receive such instant messages, they found that the messages are usually useless messages sent from strangers, namely, the so-called junk messages, so they will usually delete these junk messages. But as the number of junk messages is increasing, deleting such messages takes more time, and network frequency bandwidth and server storage space are wasted as well, and even the users have to pay extra data communication fees, so this has seriously affected normal communication of people. In this case, it is an urgent problem to be solved as to how to prevent such junk messages from being sent to users through instant messaging.

SUMMARY OF THE INVENTION

The object of the present invention is to provide a paid instant message system and method that authenticate identities using a mobile telephone network, thus realizing various applications for preventing the junk messages from being transmitted to users through instant messaging.

The object of the present invention is achieved in such a way as described below: a paid instant message system that authenticates identities using a mobile telephone network is adopted, which is characterized in that said system comprises a message server (1), cell phones (2) of different users, mobile telephone networks (3) of cell phones (2) of different users, wherein, said message server (1) is communicatively connected to each mobile telephone network (3) and is provided with a server end software for instant messaging, so that the cell phone (2) of each user accesses the message server (1) through the mobile telephone network (3) to perform instant messaging; the message server (1) includes a user account of each user, each user account is associated with an identity by which the cell phone (2) of said user accesses the mobile telephone network (3); a instant messaging application is installed in the cell phone (2) of the user, and the cell phone (2) accesses the message server (1) through said instant messaging application via the mobile telephone network (3) to perform instant messaging with cell phones (2) of other users, and each user account includes a specified charge, when a user uses the instant messaging application of the cell phone (2) to transmit message to other cell phones (2) through the message server (1), he needs to pay the user of the cell phone (2) receiving the message, i.e. the receiver, the fee specified by the charge in the user account of the receiver.

In addition, a paid instant message method that authenticates identities using a mobile telephone network is adopted, which is characterized in that said method comprises: providing a message server (1), said message server (1) being communicatively connected to each mobile telephone network (3) and being provided with a server end software for instant messaging, so that the cell phone (2) of each user accesses the message server (1) through the mobile telephone network (3) to perform instant messaging; the message server (1) includes a user account of each user, each user account is associated with an identity by which the cell phone (2) of said user accesses the mobile telephone network (3); a instant messaging application is installed in the cell phone (2) of the user, and the cell phone (2) accesses the message server (1) through said instant messaging application via the mobile telephone network (3) to perform instant messaging with cell phones (2) of other users, and each user account includes a specified charge, when a user uses the instant messaging application of the cell phone (2) to transmit message to other cell phones (2) through the message server (1), he needs to pay the user of the cell phone (2) receiving the message, i.e. the receiver, the fee specified by the charge in the user account of the receiver.

In this way, the object of the present invention is well achieved.

The paid instant message system and method that authenticates identities using a mobile telephone network according to the present invention uses a paying and charging mechanism to prevent junk messages from being transmitted to users through instant messaging. Since senders of the instant message need to pay the message receivers, the cost for sending the instant message increases, and whoever oversending the message needs to pay a corresponding fee for the instant message sent, thus appearance of junk messages can be greatly reduced. As for the normal instant messaging among people and among companies having business exchange, messages are sent and received by each other, so they pay each other, and in this case, the fees paid and charged by one person or by one company will almost be equal, hence this will not cause any burden and influence to anyone who normally uses the instant messaging.

BRIEF DESCRIPTION OF THE DRAWINGS

In the figures, the same numerals represent the same system, means, component or device. The figures are exemplary and are for illustrating the construction and main features of the present invention.

DETAILED DESCRIPTION OF THE INVENTION

The method of the present invention will be described in further detail below with reference to the drawings.

Figure 1:
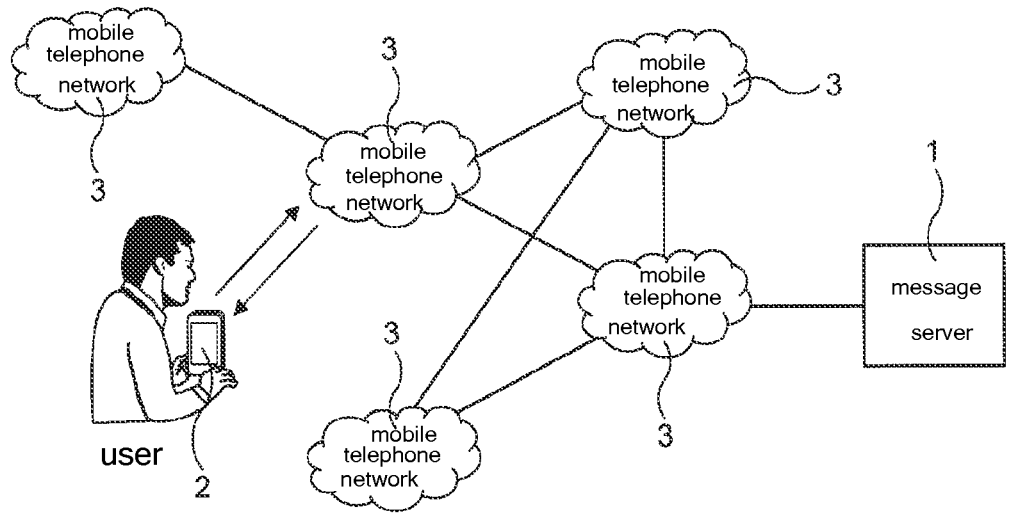
FIG. 1 is a schematic drawing of the structure of the first embodiment of the paid instant message system of the present invention.

Referring to FIG. 1, which is a schematic drawing of the structure of the first embodiment of the paid instant message system of the present invention. The system in FIG. 1 comprises a message server (1), cell phones (2) of different users, mobile telephone networks (3) to which cell phones (2) of different users belong, wherein said message server (1) is communicatively connected to each mobile telephone network (3) and is provided with a server end software for instant messaging, so that the cell phone (2) of each user accesses the message server (1) through the mobile telephone network (3) to perform instant messaging; the message server (1) includes a user account of each user, each user account is associated with an identity by which the cell phone (2) of said user accesses the mobile telephone network (3); a instant messaging application is installed in the cell phone (2) of the user, and the cell phone (2) accesses the message server (1) through said instant messaging application via the mobile telephone network (3) to perform instant messaging with cell phones (2) of other users, and each user account includes a specified charge, when a user uses the instant messaging application of the cell phone (2) to transmit message to other cell phones (2) through the message server (1), he needs to pay the user of the cell phone (2) receiving the message, i.e. the receiver, the fee specified by the charge in the user account of the receiver.

Referring still to FIG. 1, wherein the method adopted by the system comprises providing a message server (1), said message server (1) being communicatively connected to each mobile telephone network (3) and being provided with a server end software for instant messaging, so that the cell phone (2) of each user accesses the message server (1) through the mobile telephone network (3) to perform instant messaging; the message server (1) includes a user account of each user, each user account is associated with an identity by which the cell phone (2) of said user accesses the mobile telephone network (3); a instant messaging application is installed in the cell phone (2) of the user, and the cell phone (2) accesses the message server (1) through said instant messaging application via the mobile telephone network (3) to perform instant messaging with cell phones (2) of other users, and each user account includes a specified charge, when a user uses the instant messaging application of the cell phone (2) to transmit messages to other cell phones (2) through the message server (1), he needs to pay the user of the cell phone (2) receiving the message, i.e. the receiver, the fee specified by the charge in the user account of the receiver.

In this description, the instant messaging refers to that a user accesses the message server (1) using the cell phone (2) over a network, and instantly transmits message to cell phones (2) of other users that have accessed the message server (1), since both parties concerned in the communication have accessed the message server (1), they can not only exchange message, but also learn the latest state of each other, learn whether the message has been successfully sent and whether the received message has been read, etc. In this description, the cell phones (2) include mobile phones or intelligent phones of various standards, or various mobile communication terminals that can connect to the Internet, but for easy description, they are all called cell phones (2) herein; as for the mobile telephone network (3), it includes mobile telephone networks of various standards including GSM, 3G, 4G, CDMA, TD-SCDMA, LTE and so on. In addition, the present invention also uses the identity by which the cell phone (2) accesses the mobile telephone network (3) to confirm the user's identity. Generally, when a cell phone accesses a mobile telephone network, the mobile telephone network will authenticate the SIM card in the cell phone, and only after a successful authentication, can the cell phone access the mobile telephone network for communication, so the present invention uses the identity of the cell phone (2) in the mobile telephone network to authenticate the user's identity; a cell phone (2) usually uses a "SIM card" as its ID in the mobile telephone network, so the present invention can directly use the "SIM card" to authenticate the user's identity, namely, the message server (1) confirms the user's identity by verifying information of the SIM card of the cell phone (2) through the instant messaging application in the user's cell phone (2), thus effectively preventing identity faking and ensuring authenticity of identities of the message sender and receiver.

Figure 2:
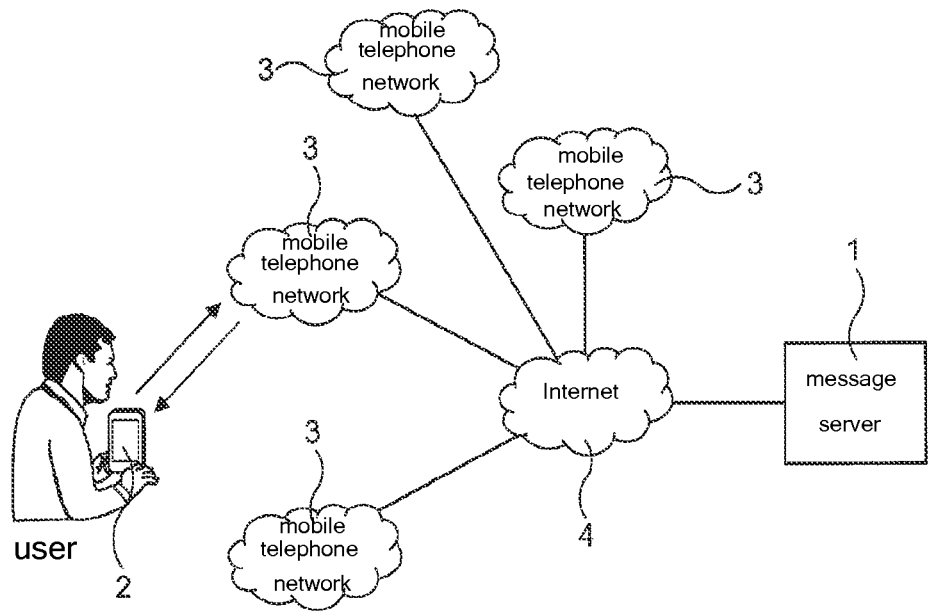
FIG. 2 is a schematic drawing of the structure of the second embodiment of the paid instant message system of the present invention.

Referring to FIG. 2, which is a schematic drawing of the structure of the second embodiment of the paid instant message system of the present invention. FIG. 2 shows the main difference between the second embodiment and the first embodiment, which lies in that the second embodiment further includes an Internet (4), and the message server (1) is communicatively connected to each mobile telephone network (3) via the Internet (4), while in the first embodiment, the message server (1) communicatively connects to each of the rest mobile telephone networks (3) via one of the mobile telephone networks (3). In the first embodiment, the message server (1) connects to a charging system of each of the rest of the mobile telephone networks (3) via a charging system of one of the mobile telephone networks (3) to charge the fees for the user to send and receive messages to the mobile phone account of the user, while in the second embodiment, the message server (1) directly connects to the charging system of each mobile telephone network (3) via an Internet (4) to charge the fees for the user to send and receive messages to the mobile phone account of the user. In the first and second embodiments, the user of the cell phone (2) sending the message needs to pay a fee to the user of the cell phone (2) receiving the message, and said fee is charged by the message server (1) to the mobile phone account of the mobile telephone network (3) to which the message sending cell phone (2) belongs when settling the accounts, and is paid into the mobile telephone account of the mobile telephone network (3) to which the message receiving cell phone (2) belongs after a commission charge having been deducted therefrom.

Figure 3:
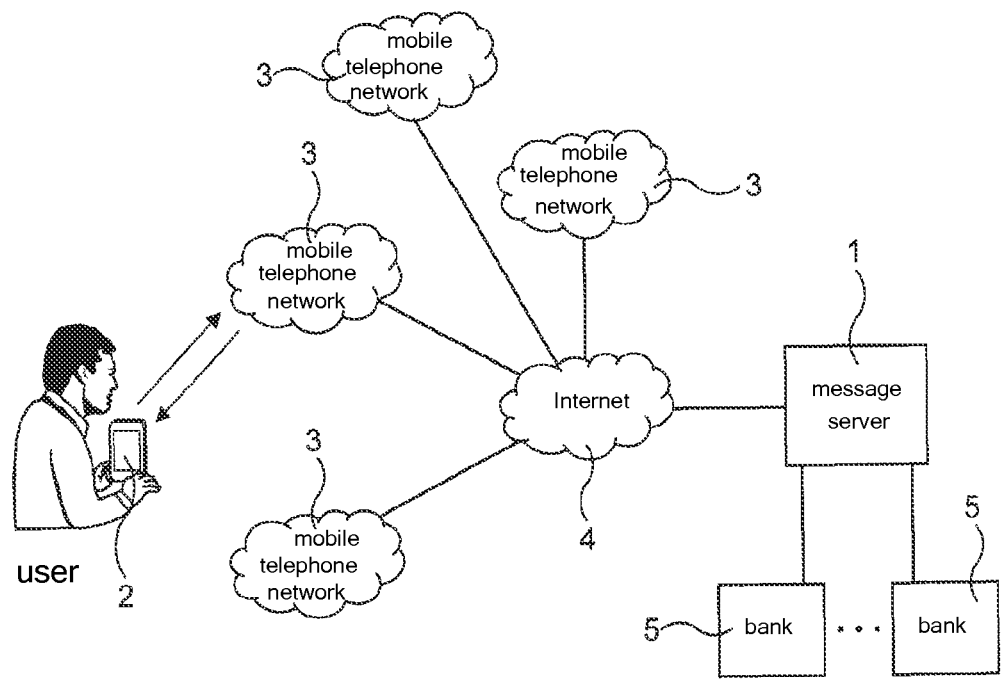
FIG. 3 is a schematic drawing of the structure of the third embodiment of the paid instant message system of the present invention.

Referring to FIG. 3, which is a schematic drawing of the structure of the third embodiment of the paid instant message system of the present invention. The main difference between the third embodiment shown in FIG. 3 and the second embodiment lies in that the system of the third embodiment further comprises a bank (5), said bank (5) has a bank account of the user, and the user needs to register his bank account information into the message server (1) in advance and associate the user's account in the message server (1) with the user's bank account, and to authorize the message server (1) to use the user's bank account to settle the fees for sending and receiving messages, and when the user uses a cell phone (2) to send messages to cell phones of other uses via the message server (1), the user of the message sending cell phone (2) needs to pay a fee to the user of the message receiving cell phone (2), and said fee is charged by the message server (1) to the bank account of the user of the cell phone (2) sending the messages and is paid into the bank account of the user of the cell phone (2) receiving the messages after a commission charge having been deducted therefrom. In this embodiment, said bank account includes debit card account, credit card account, check account, savings account, etc., and to facilitate description, they are all called bank account herein.

A further improvement of the present invention is that said user account also includes a message transmission status record, which records the status of the cell phone (2) receiving messages via the message server (1), including: whether a messages has been successfully transmitted to the receiver cell phone (2), whether a message has been read in the receiver cell phone (2), and so on, and the message server (1) performs operations of paying and charging according to the message transmission status record in the user's account when settling the accounts. For example, if a mechanism is adopted in which a charging is made only if the message receiver reads the message, then the message server (1) will not charge the user of the cell phone (2) sending the message to pay the user of the cell phone (2) receiving said message until the message receiving user has read the message received by his cell phone (2).

One of the main features of the present invention is to use a paying and charging mechanism to prevent junk messages, the user sending a message needs to pay a fee to the user receiving the message, and said fee may be a fixed charge and be charged according to the number of messages, for example, $1 needs to be paid for each one message sent, alternatively, the fees may be charged according to the size of the message, for example, $1 is charged for sending 1 KB. Or the fees may be charged according to time duration, for example, from the starting of the sending of messages, 5 minutes is a unit, and $1 is charged every 5 minutes, and during said 5 minutes, the user may send any number of messages to the same receiver. Or the fees may be charged according to both the number of messages and the time duration, and the object of the present invention can be achieved effectively in either of these ways. In addition to using a fixed charge, it is also possible to make each user account has a different charge specified by the user himself, the user can decide the specific charge as desired, for example, if the user does not want to be disturbed, he may set that $1000 should be charged for each message, and anyone who is willing to pay can send messages to this user, and this is especially suitable for those celebrities and stars, and the message server (1) charges the message sender only after the celebrities and stars received and read the message. While as for common users, only a very low charge needs to be set, and since these users exchange messages, they pay each other, thus the paid fees and the charged fees will be almost equal and in most cases, the users will not pay a lot of money for the messages, but propagation of junk messages, on the other hand, can be prevented effectively. Moreover, the charge can be set according to the identity of the message sender, and the user can decide the charge according to the relationship with the sender, for example, the charge is zero, i.e. free, for friends and relatives, while for unknown senders, the charge is $1 for receiving one message, and for senders who frequently send disturbing messages, the charge is $10 for receiving one message. By such a mechanism of different charges, the object of the present invention can be better achieved. In order to realize setting the charge according to the identity of the message sender, a list of charges needs to be provided in the user account, which contains one or more records, each record including a specified charge as well as the identity information of the message sender, then, according to the list of charges and the identity of sender, the message server (1) can charge corresponding fees from the sender's account and pay the said fees into the receiver's account.

In addition, the user may set the charges according to different message sender identities just before receiving the messages, and all that is need is to add a group of steps A of setting the charges by the user to the method of the present invention. Said group of steps A is that the user sets a charge to the message server (1) through the instant messaging application in the cell phone (2) before the user's cell phone (2) receives instant messages from other cell phones (2), the specific group of steps A is as follows:

A1: the user sending the message, i.e. the sender, using the instant messaging application of his cell phone (2) to transmit a request for message transmission to the message server (1) via the mobile telephone network (3), said request for message transmission including such content as the relevant information of the user receiving the message, i.e. the receiver;

A2: the message server (1) transmitting the identity information of the sender to the cell phone (2) of the receiver via the mobile telephone network (3) according to the content of the request for message transmission to request the receiver to prepare to receive the message;

A3: the receiver learning the identity of the sender by checking the received message using the instant messaging application in his cell phone (2), and using the instant messaging application in the cell phone (2) to transmit the charge to the message server (1) via the mobile telephone network (3) if he agrees to receive the message;

A4: the message server (1) receiving the charge transmitted from the receiver and transmitting said charge to the cell phone (2) of the sender via the mobile telephone network (3);

A5: the sender transmitting the instant message that needs to be transmitted to the receiver to the message server (1) via the mobile telephone network (3) using the instant messaging application in his cell phone (2) if a payment is agreed;

A6: the message server (1) transmitting said instant message to the cell phone (2) of the receiver via the mobile telephone network (3);

A7: when the receiver opens said instant message using the instant messaging application of his cell phone (2), the instant messaging application of said cell phone (2) marking said instant message as being read already, which means that said instant message has been read in the cell phone (2) of the receiver, and reporting the latest status of said instant message to the message server (1);

A8: the message server (1) storing the latest status of said instant message in the message transmission state records of the user accounts of the sender and the receiver, respectively, and performing the charging and paying operations according to the message transmission status record of the user's account when settling the accounts.

The features of the present invention has been described above in detail, although the present invention is described using the above-mentioned embodiments, the present invention is not limited to them, and various changes and variations can be made without departing from the spirit of the present invention and the scope of the appended claims.

The paid instant message system and method that use a mobile telephone network to authenticate identities according to the present invention prevent the junk messages from being transmitted to users through instant messaging by means of a paying and charging mechanism, so they are beneficial for the popularization and application of instant messaging.

What is claimed is:

1. A paid instant message system that authenticates identities using a mobile telephone network, said system comprising:
a message server, cell phones of different users, mobile telephone networks of cell phones of different users, wherein, said message server is communicatively connected to each mobile telephone network and comprises a server end software for instant messaging, so that the cell phone of each user accesses the message server through a mobile telephone network to perform instant messaging;

the message server comprises a user account of each user, each user account is associated with an identity by which the cell phone of said user accesses the mobile telephone network; and an instant messaging application is installed in the cell phone of a user, and the cell phone accesses the message server through said instant messaging application via the mobile telephone network to perform instant messaging with cell phones of other users, and each user account includes a specified charge, when a user uses the instant messaging application of the cell phone to transmit a message to other cell phones through the message server, the user of a cell phone sending the message pays the user of the cell phone receiving the message a fee specified by the charge in the user account of a receiver, so as to prevent junk messages from being transmitted to users through instant messaging by means of a paying and charging mechanism via instant messages;

wherein said fee is charged by the message server to a bank account of the user of the cell phone sending the messages and is paid into the bank account of the user of the cell phone receiving the messages after a commission charge having been deducted therefrom, wherein the user sets a charge to the message server through the instant messaging application in the cell phone before a user's cell phone receives instant messages from other cell phones based on a specific group of steps A as follows:

A1: the user of the cell phone sending the message, using the instant messaging application of the cell phone to transmit a request for message transmission to the message server via the mobile telephone network, said request for message transmission including such content as relevant information of the user of the cell phone receiving the message;

A2: the message server transmitting identity information of a sender to the cell phone of the receiver via a mobile telephone network according to the content of the request for message transmission to request the receiver to prepare to receive the message;

A3: the receiver learning an identity of the sender by checking the received message using the instant messaging application in the cell phone, and using the instant messaging application in the cell phone to transmit the charge to the message server via the mobile telephone network if the receiver agrees to receive the message;

A4: the message server receiving the charge transmitted from the receiver and transmitting said charge to the cell phone of the sender via the mobile telephone network;

A5: the sender transmitting the instant message that needs to be transmitted to the receiver to the message server via the mobile telephone network using the instant messaging application in the cell phone if a payment is agreed;

A6: the message server transmitting said instant message to the cell phone of the receiver via the mobile telephone network;

A7: when the receiver opens said instant message using the instant messaging application of the receiver's cell phone, the instant messaging application of said cell phone marking said instant message as being read already, which means that said instant message has been read in the cell phone of the receiver, and reporting a latest status of said instant message to the message server; and A8: the message server storing the latest status of said instant message in a message transmission state records of the user accounts of the sender and the receiver, respectively, and performing charging and paying operations according to the message transmission status record of the user's account when settling the accounts.

2. The paid instant message system that authenticates identities using a mobile telephone network according to claim 1, wherein said message server confirms a user's identity by using the instant messaging application in the cell phone of the user to verify a SIM card information of said cell phone.

3. The paid instant message system that authenticates identities using a mobile telephone network according to claim 1, wherein:

said system comprises a bank provided with a user's bank account; and the fee is charged by the message server to the user's bank account of the cell phone (2) sending the message when settling the account, and is paid into a user's bank account of the cell phone receiving the message after a commission charge having been deducted.

4. A paid instant message method that authenticates identities using a mobile telephone network, wherein said method comprises:

providing a message server, said message server being communicatively connected to each mobile telephone network and being provided with a server end software for instant messaging, so that a cell phone of each user accesses the message server through the mobile telephone network to perform instant messaging;

the message server includes a user account of each user, each user account is associated with an identity by which the cell phone of said user accesses the mobile telephone network; and an instant messaging application is installed in the cell phone of the user, and the cell phone accesses the message server through said instant messaging application via the mobile telephone network to perform instant messaging with cell phones of other users, and each user account includes a specified charge, when a user uses the instant messaging application of the cell phone to transmit message to other cell phones through the message server, the user of a cell phone sending the message pays the user of the cell phone receiving the message a fee specified by charge in the user account of a receiver, so as to prevent junk messages from being transmitted to users through instant messaging by means of a paying and charging mechanism via instant messages;

wherein said fee is charged by the message server to a bank account of the user of the cell phone sending the messages and is paid into the bank account of the user of the cell phone receiving the messages after a commission charge having been deducted therefrom, wherein said method comprises a group of steps A of setting the charges by a user, said group of steps A is that the user sets a charge to the message server through the instant messaging application in the cell phone before a user's cell phone receives instant messages from other cell phones, a specific group of steps A is as follows:

A1: the user of the cell phone sending the message, using the instant messaging application of the cell phone to transmit a request for message transmission to the message server via the mobile telephone network, said request for message transmission including such content as relevant information of the user of the cell phone receiving the message;

A2: the message server transmitting identity information of a sender to the cell phone of the receiver via a mobile telephone network according to the content of the request for message transmission to request the receiver to prepare to receive the message;

A3: the receiver learning an identity of the sender by checking the received message using the instant messaging application in the cell phone, and using the instant messaging application in the cell phone to transmit the charge to the message server via the mobile telephone network if the receiver agrees to receive the message;

A4: the message server receiving the charge transmitted from the receiver and transmitting said charge to the cell phone of the sender via the mobile telephone network;

A5: the sender transmitting the instant message that needs to be transmitted to the receiver to the message server via the mobile telephone network using the instant messaging application in the cell phone if a payment is agreed;

A6: the message server transmitting said instant message to the cell phone of the receiver via the mobile telephone network;

A7: when the receiver opens said instant message using the instant messaging application of the receiver's cell phone, the instant messaging application of said cell phone marking said instant message as being read already, which means that said instant message has been read in the cell phone of the receiver, and reporting a latest status of said instant message to the message server; and A8: the message server storing the latest status of said instant message in a message transmission state records of the user accounts of the sender and the receiver, respectively, and performing charging and paying operations according to the message transmission status record of the user's account when settling the accounts.

5. The paid instant message method that authenticates identities using a mobile telephone network according to claim 4, wherein a list of charges is provided in the user account, which contains one or more records, each record including a specified charge as well as identity information of a message sender.

6. The paid instant message method that authenticates identities using a mobile telephone network according to claim 4, wherein said fee is charged by the message server to a mobile phone account of the mobile telephone network to which a message sending cell phone belongs when settling the accounts, and is paid into the mobile telephone account of the mobile telephone network to which the message receiving cell phone belongs after a commission charge having been deducted therefrom.

7. The paid instant message method that authenticates identities using a mobile telephone network according to claim 4, wherein said user account also includes a message transmission status record, which records a status of a cell phone receiving messages via the message server, including: whether a messages has been successfully transmitted to a receiver cell phone, whether a message has been read in the cell phone receiving messages, and the message server performs operations of paying and charging according to the message transmission status record in the user's account when settling the accounts.

* * * * *